Nov. 10, 1964 J. S. DUNKER 3,156,306
CARRIER FOR MULTISECTION FARM IMPLEMENTS
Filed Sept. 4, 1962 3 Sheets-Sheet 1

INVENTOR.
JOHN S. DUNKER
BY Joseph W. Holloway
ATTORNEY

Nov. 10, 1964  J. S. DUNKER  3,156,306
CARRIER FOR MULTISECTION FARM IMPLEMENTS
Filed Sept. 4, 1962  3 Sheets-Sheet 2

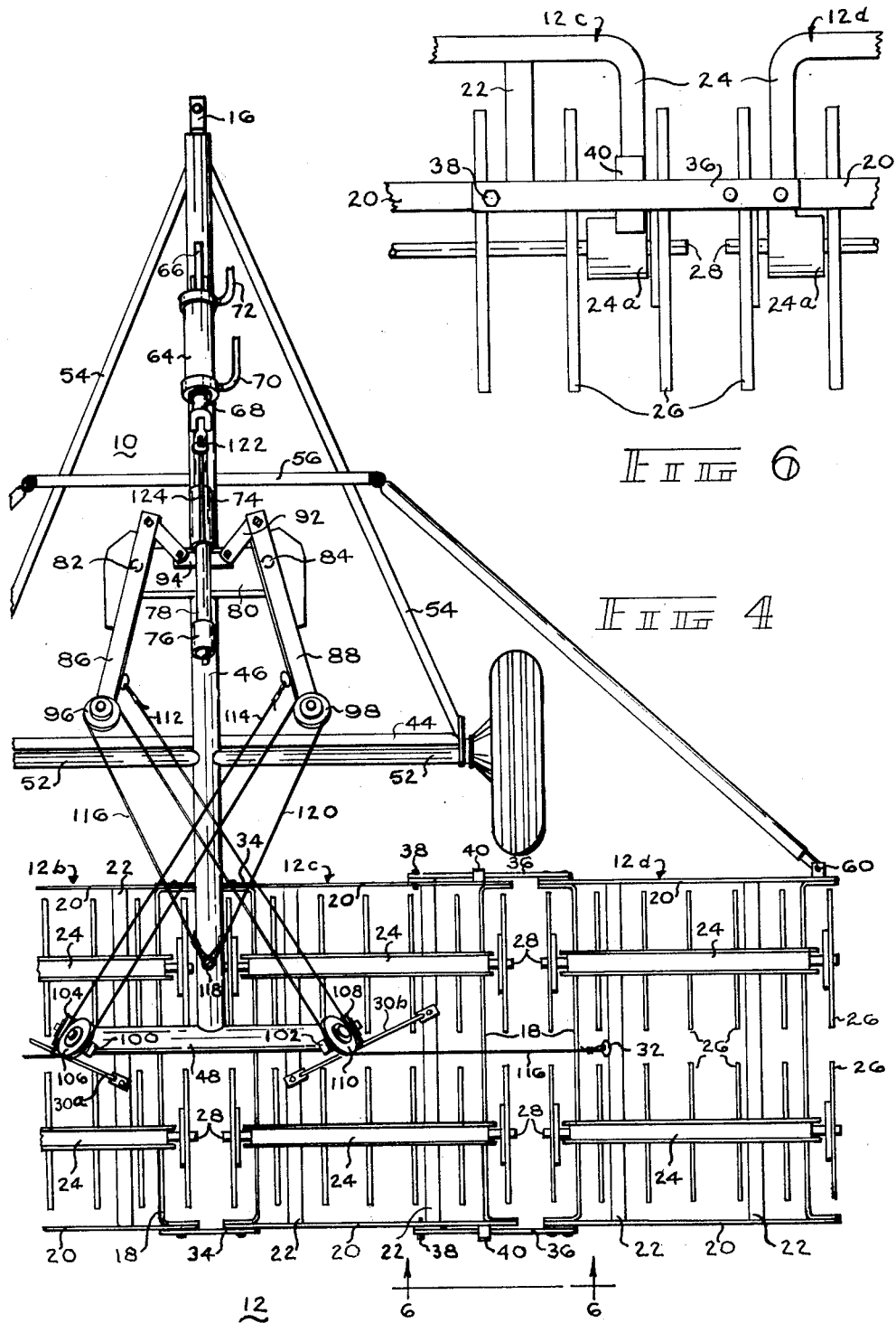

United States Patent Office 3,156,306
Patented Nov. 10, 1964

3,156,306
CARRIER FOR MULTISECTION FARM
IMPLEMENTS
John S. Dunker, Hull, Ill.
Filed Sept. 4, 1962, Ser. No. 221,197
2 Claims. (Cl. 172—456)

The present invention generally pertains to improvements in carriers for tractor-drawn farm implements of the multisection type, such as harrows and rotary hoes.

While the many advantages afforded by joining several like implement sections in side by side relation are generally well known and appreciated by farmers and by implement manufacturers, several problems are encountered in the employment of such implements. For example, the overall width of the fully assembled implement is typically so great that transportation of the implement over narrow country roads and through field or farm lot entrances is impossible in most instances without disassembly of the outboard implement sections. Furthermore, turning maneuvers required during tillage of row crops demand careful attention and unusually great operator skill in order to avoid destruction of plants growing in the turning area.

Therefore, a broad object of this invention is to provide a carrier means for multisection implements which will improve the portability and maneuverability of such implements.

Another object is the provision of an implement carrier having means for elevating inboard and outboard sections with respect to the ground surface, thereby facilitating turning maneuvers and the like.

Yet another object is the provision of an implement carrier having means operable to fold pivotable outboard sections upwardly and inwardly with respect to the inboard sections thereby to substantially reduce the overall width of the implement and to greatly facilitate transportation and storage of the same.

Still another object is to provide an implement carrier having hydraulic power means for mechanically elevating and folding the implement sections in the aforedescribed manner, thereby eliminating dangerous manual handling of heavy and cumbersome implement sections.

A still further object is to provide an implement carrier having power means for simultaneously elevating the inboard and outboard sections and folding the outboard sections thereby effecting increased maneuverability and portability of the implement in an efficient and time-saving manner.

A more specific object is to provide an operating means for an implement carrier of the aforedescribed type which is cooperable with foldable outboard sections to effect a controlled rate of raising and lowering the same without manually urging the sections through an overcenter position and without dangerous and destructive free falling of the sections against the frame of the carrier or against the ground surface.

Yet another specific object is to provide an implement carrier operable to fold outboard sections upwardly and inwardly to a folded position which is mechanically adjustable to provide either full folding for transporting the implement from field to field, or only partial folding for turning maneuvers.

A still more specific object is to provide an implement carrier constructed to provide safe and efficient coordinated elevation and folding of the implement sections and to provide such a carrier which is characterized by ruggedness and simplicity in construction, low initial cost, and ease of maintenance and repair.

These and other objects and advantages will appear upon reading the following detailed specification and the appended claims and upon considering in connection therewith the accompanying drawings, in which:

FIG. 4 is a fragmentary top plan view of the implement and implement carrier shown in FIG. 3;

FIG. 6 is an enlarged fragmentary elevational view looking along line 6—6 of FIG. 4, and showing details of the pivotal connections between inboard and outboard implement sections.

Figures 1, 2:
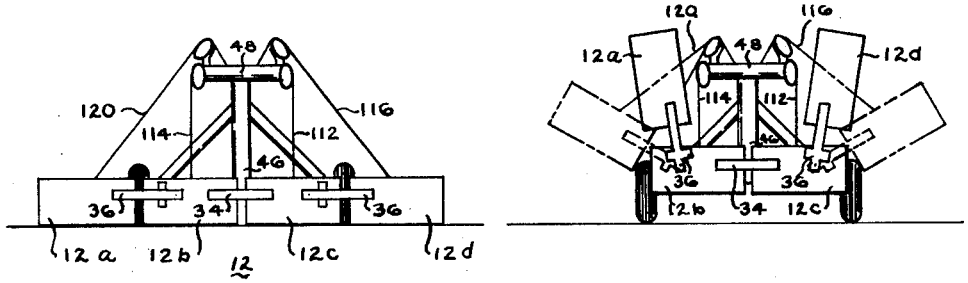
FIG. 1 is a diagrammatic rear view of a multisection implement operatively associated with an improved carrier constructed in accordance with the present invention and wherein the implement sections are shown in a lowered or ground-engaging position.
FIG. 2 is a diagrammatic view similar to FIG. 1 wherein the inboard sections are shown in an elevated position and the outboard sections are shown in alternative folded positions by means of full lines and phantom lines.

In accordance with the present invention, the carrier, generally indicated by numeral 10, is adapted to lift and transport the multisection implement, generally indicated by the numeral 12. While the carrier 10 is operable to perform its intended function with many types of conventional multisection farm implements, the illustrative implement comprises a well-known rotary hoe used extensively as a tillage tool for corn, beans, cotton and other row crops. As will be understood from FIG. 3, the forward or front end of the carrier is removably attached to a rearwardly extending hitch 14 of a tractor 15 by means of a conventional clevis and pin coupling 16. As best shown in FIGS. 1 and 2, the implement 12 is made up from four duplicate rotary hoe sections 12a through 12d which are laterally spaced and secured together in side by side relation. While a greater or smaller number of implement sections may be employed, the illustrated embodiment employs two inboard or center sections 12b and 12c and two outboard or outer sections 12a and 12d. Throughout the drawings, like numerals will be used to identify corresponding parts of the rotary hoe sections 12a through 12d.

Figure 3:
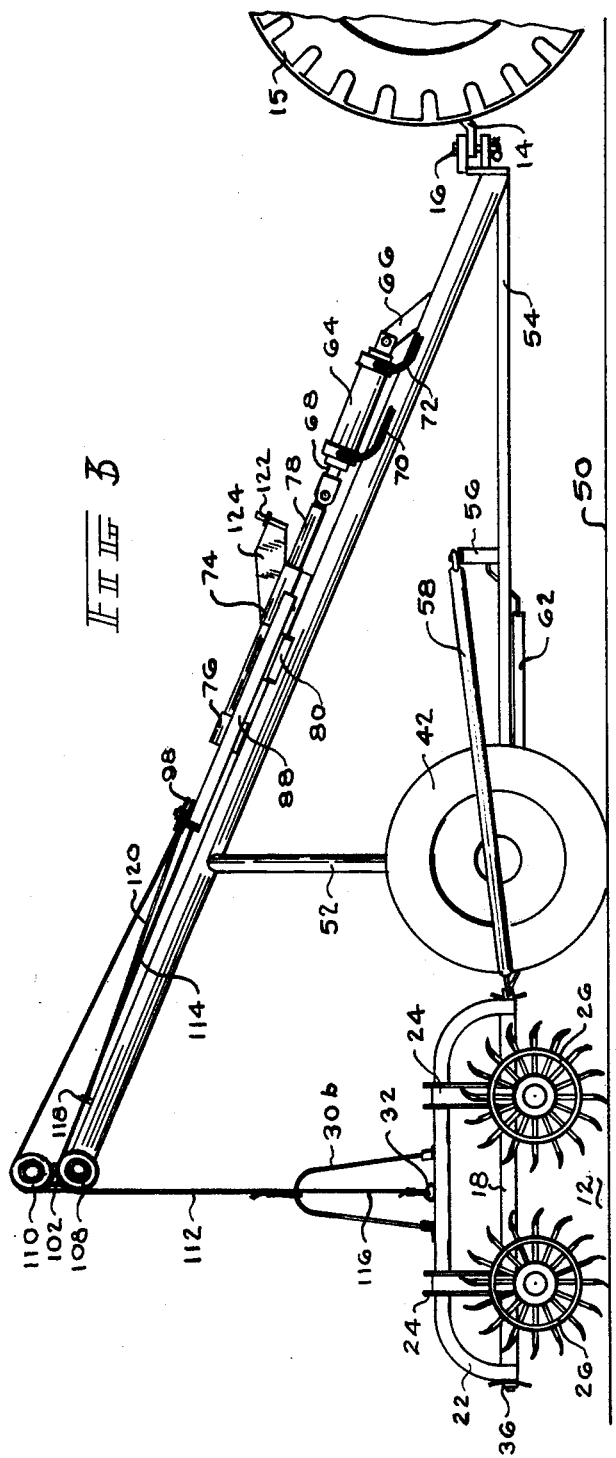
FIG. 3 is a side elevation of an improved implement carrier constructed in accordance with the present invention showing the implement sections in the ground-engaging position.

Referring to FIGS. 3 and 4, the transversely connected implement sections generally comprise rigid rectangular frames formed by longitudinal elements 18 and transverse elements 20. Spaced longitudinal members 22 are rigidly connected between the forward and rear transverse elements 20; and, U-shaped channel members 24 overlying the members 22 are rigidly connected between the longitudinal elements 18. A plurality of tined wheels 26 are mounted in spaced apart relation on pairs of longitudinally spaced axles 28 which penetrate spaced leg portions 24a of the channel members 24 of respective sections. For a purpose to be explained, bails 30a and 30b are secured to the spaced longitudinal members 22 of the inboard sections 12b and 12c; and, inverted U-shaped connectors, one of which is shown at numeral 32, are rigidly secured to the inner longitudinal members 22 of the outboard sections 12a and 12d. The inboard sections 12b and 12c are secured together by means of tie bars 34 which connect adjacent ends of the transverse elements 20 of the inboard sections. The hinge plates 36, which join the outboard sections 12a and 12d in hinged relation to the inboard sections 12b and 12c, respectively, are illustrated at FIG. 6 which shows the outer end of a hinge plate 36 rigidly connected to the transverse element 20 of section 12d and the inner end of the hinge plate 36 pivotally journalled by a horizontally disposed pivot pin 38 penetrating registering apertures in the hinge plate 36 and the transverse element 20 of the inboard section 12c. Preferably, though not necessarily, oppositely extending ears or tabs 40 are rigidly secured to the hinge plates 36 and coact with the elements 20 to establish and maintain lateral alignment between the inboard and outboard sections while providing ample relative vertical movement therebetween to enable the outboard sections to follow ground contours closely for good tillage of rolling land.

In the construction according to the invention, the carrier 10 is supported by a set of wheels 42, which are journalled by the axle 44; and, the carrier generally includes a T-shaped support comprising a center beam 46 which inclines rearwardly from the aforementioned coupler 16 and terminates in a cross member 48 rigidly secured at its extreme rear end. The beam 46 is supported in an inclined position relative to the ground surface 50 by struts 52 which incline inwardly to rigidly connect the ends of the axle 44 to the beam 46 intermediate the length of the latter to form a rugged load bearing frame. The distal portion of the beam 46, which is to the rear of the point of attachment of the struts 52, extends upwardly and rearwardly above the implement 12 and, as shown in FIG. 3, positions the cross member 48 in substantially vertical alignment with the aforementioned bails 30a and 30b and the U-shaped elements 32 for a purpose to be described. A pair of stringers 54 connect the axle 44 and the forward end of the beam 46; and, a transverse brace 56 connects the stringers 54 intermediate their ends. The drawbars 58 swingably connect the upturned opposite ends of the brace 56 to the pivot connections 60, located at the outer ends of the forward transverse elements 20 of the outboard sections 12a and 12b, to couple a pulling force to the outboard sections from the tractor 15. Similarly, a drawbar 62 is connected between the central point of the brace 56 and a suitable coupling, not shown, attached to the forward tie bar 34 joining the inboard sections 12b and 12c.

A reciprocable power actuator, such as an extensible hydraulic cylinder 64, is mounted upon the carrier 10 near the forward end of the beam 46 with the cylinder housing secured thereto by means of a bracket 66. The fluid actuated piston rod 68 of the cylinder projects rearwardly for controlled extension and retraction in a well-known manner. Flexible conduits 70 and 72 communicate hydraulic fluid from the usual hydraulic power system, not shown, of the tractor 15; and, control means for the cylinder 64, not shown, are conveniently located for manipulation by an operator seated upon the tractor. Longitudinally spaced bearing sleeves 74 and 76 are coaxially fixed to the beam 46 to receive and to slidably journal a cylindrical plunger 78 which is connected to the piston rod 68 for coextensive reciprocation therewith. A plate 80 is secured transversely to the beam 46 intermediate the sleeves 74 and 76 and carries pivot pins 82 and 84 adjacent its opposite ends. Like elongated arms 86 and 88 are pivotally mounted upon the pivot pins 82 and 84, respectively; and, the arms are pivotable between extended and collapsed positions, corresponding to the full line and phantom line positions shown in FIG. 5. Lateral extending and collapsing movement of the swing arms 86 and 88 relative to beam 46 is effected in response to longitudinal extension and retraction of the piston rod 68 and the attached reciprocating plunger 78; and, such movement is imparted to the swing arms by means of pivoted linkage elements 90 and 92 which operatively connect the rear ends of the swing arms to a member 94 fixed transversely to and in underlying relation with the plunger 78.

As best illustrated in FIGS. 3 and 4, idler pulleys 96 and 98 are rotatably mounted at the free ends of the swing arms 86 and 88, respectively; and, bent brackets 100 and 102 are fixed at opposite ends of the cross member 48 for rotatably mounting vertically spaced idler pulleys 104, 106, 108, and 110, respectively. A cable 112, or an equivalent flexible element, which is secured at its forward end adjacent the free end of the swing arm 86, is trained or reeved about idler pulley 108 and is secured at its other end to the aforementioned bail 30b mounted upon the inboard implement section 12c. A cable 114, which is secured at its forward end adjacent the free end of the swing arm 88, is reeved about pulley 104 and is secured at its other end to a bail 30a mounted upon implement section 12b. One end of a cable 116 is detachably secured to a post 118 which extends vertically from the center beam 46 near the rear end of the latter. Cable 116 is then reeved about the pulley 96, carried by the swing arm 86, and about the pulley 110; and, the other end thereof is secured to the outboard section 12d about the bight portion of the U-shaped connector 32. Cable 120 is also detachably secured to post 118 and is reeved about the pulleys 98 and 106 and is secured to the outboard section 12a in a manner corresponding to that described above in relation to cable 116 and section 12d. Thus it will be understood that the arms 86 and 88 are connected in lift force transmitting relation with each of the sections 12a through 12d.

With the cables 112, 114, 116 and 120 reeved in the above described manner and as shown in FIGS. 3 and 4, the carrier 10 operates in the following manner: With the implement sections in the lowered or ground-engaging position shown in FIG. 1, the tractor operator may hydraulically actuate the cylinder 64 to cause the piston rod 68 and the plunger 78 to extend outwardly, or in this case toward the rear of the carrier 10. The rearward linear movement of the plunger 78 will effect pivoting or swinging of the arms 86 and 88 about the pins 82 and 84 due to the coaction of the arms, the links 90 and 92, the plate 80, and the member 94. As the plunger is moved from the position shown in FIG. 4 to that shown in FIG. 5, the arms 86 and 88 will swing outwardly and forwardly to the full line position shown in FIG. 5. In response to forward swinging of the arms 86 and 88, a pull will be imparted to the cables 112 and 114; and, the inboard sections 12b and 12c will be lifted vertically to an elevated position above the ground surface as shown in FIG. 2. Simultaneously, the swinging of arms 86 and 88 will impart a pull to cables 116 and 120 which will lift the outboard sections 12a and 12d upwardly and inwardly about the aforementioned pivot pins 38 to a fully folded position shown in full lines in FIG. 2. Since the cables 116 and 120 are attached rearwardly of the idler pulleys 96 and 98 and since these pulleys swing forwardly with the lifting arms 86 and 88, it will be understood that the rate of travel of the cables 116 and 120 is substantially greater than that of cables 112 and 114. Preferably, the cable lengths and their respective points of attachment to the carrier 10 and the implement 12 are selected to provide a predetermined folding speed for the outboard section 12a and 12d which is so related to the lifting speed of the inboard sections 12b and 12c that the sections will assume a position substantially as shown in the full line view of FIG. 2 upon full extension of the piston rod 68. To lower and unfold the implement 12 the cylinder 64 is hydraulically actuated to retract the plunger 78, thereby to swing the lifting arms 86 and 88 from the full line position to the phantom line position shown in FIG. 5. Preferably, the hydraulic power means 64 is of the double acting type and, accordingly, the retraction of the plunger 78 may be positively controlled to effect a predeterminable rate of lowering for the inboard sections 12b and 12c and for unfolding the outboard sections 12a and 12d, thereby reducing risk of injury to personnel in the vicinity by eliminating deleterious free falling and impacting of the outboard sections. With regard to the location of post 118 relative to the arms 86 and 88, it is contemplated that the upward folding action of the outboard sections 12a and 12d will be less than 90 degrees from ground level; therefore, these sections will not pass through the vertical plane containing their pivot axes, but will, instead, exert a continuous downward and outward pull on their respective cables. Thus the sections 12a and 12d are adapted to move outwardly and downwardly without application of additional manual or mechanical force, but by the force of gravity alone.

Figure 5:
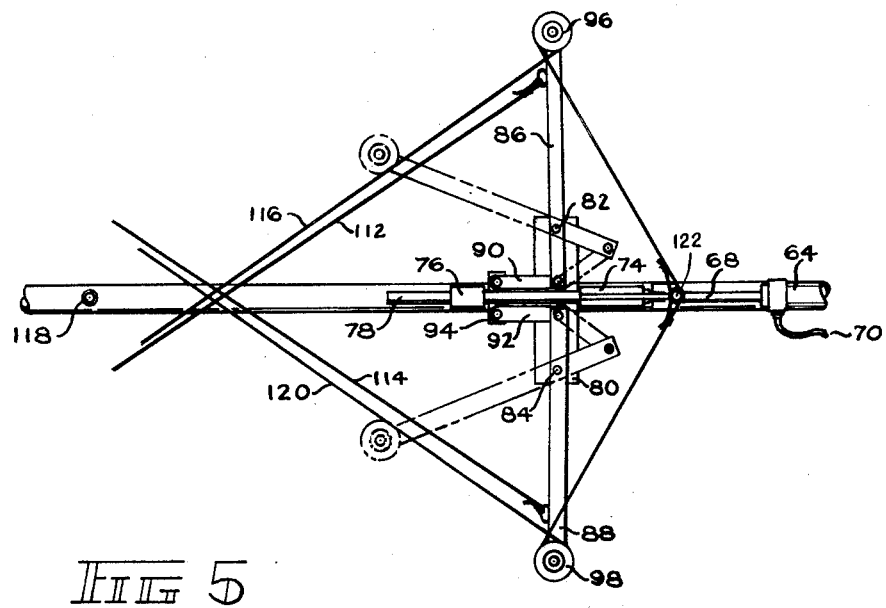
FIG. 5 is a fragmentary view of the hydraulically actuated operating mechanism which is shown in another position in FIG. 4.

While the above described carrier and the method of operation thereof fully accomplishes most of the stated objects of this invention, a modification in the manner of connecting and reeving of the cables 116 and 120, which is shown at FIG. 5, will produce an alternative mode of operation which is advantageous where full folding of the outboard sections 12a and 12d, as aforedescribed, is unnecessary or undesirable. Thus alternative means are provided to fold the outboard sections only partially, or to the position shown in phantom lines in FIG. 2, while the inboard sections are elevated as usual. Such reduction in the degree of folding of the outboard sections is acceptable during most tilling operations where ground disengagement is required only during turning maneuvers. It will be appreciated that complete folding is not necessary during such maneuvers and that partial folding will substantially reduce impacting of the outboard sections upon the ground when these sections are rapidly lowered to their working position.

To accomplish partial folding of the outboard sections while obtaining full elevation of the inboard sections, the cables for the outboard sections, 116 and 120, are detachably connected at their forward ends to an upwardly extending post 122 which is longitudinally spaced from post 118 and is located just forward from the midpoint of the center beam 46. The post 122 is spaced above and forwardly from the forward bearing sleeve 74 by means of a bracket 124 rigidly connected to the sleeve 74. The cables 116 and 120 are trained about the pulleys 96 and 98 in the manner shown in FIG. 5 and are thereafter reeved and connected in the same manner as shown in FIG. 4. From the foregoing description, it will be appreciated that the degree of folding of the outboard sections may be increased for transporting the implement, in which case the forward ends of cables 116 and 120 are connected to the post 118, or the degree of folding may be reduced for performing normal tillage operations, in which case the forward ends of the cables 116 and 120 are removed from post 118 and are transferred to post 122.

Throughout the construction of the preferred embodiment of the carrier, low cost, standard materials such as pipe, angle members and channel members have been employed whenever possible. Due to the simplicity of the carrier construction, it may be quickly and economically fabricated by welding and by the use of standard fasteners. Furthermore, the simplicity of construction of the present invention facilitates maintenance and repair of the carrier by unskilled persons having limited available repair facilities. Moreover, the simplicity of operation of the automatic elevating and folding means of the illustrative carrier enables even unexperienced operators to transport a multisection implement and to operate the same for normal tillage of crops in a more efficient, safe, and time-saving manner than was heretofore possible.

It will be understood that the above description and accompanying drawings comprehend only general and preferred embodiments of the invention and that various changes in construction, proportion, material and arrangement of the elements thereof may be made without sacrificing any of the above enumerated advantages or departing from the scope of the appended claims.

Having fully described the invention, what is claimed as new and useful is:

1. Carrier means for multisection implements, comprising:
   (a) wheel supported frame means having a center member inclined upwardly with respect to the surface of the ground and terminating at its upper end in a cross member;
   (b) a ground engaging implement comprising at least one inboard section and plural outboard sections connected to said frame means and disposed generally below said cross member;
   (c) hinge means pivotally connecting said outboard sections to said inboard section in side by side relation;
   (d) plural lifting arms pivotally mounted intermediate the ends of said center member each of which is swingable to one side thereof;
   (e) plunger means operatively linked to said lifting arms to effect swinging of the latter;
   (f) pulley means attached at either end of said cross member;
   (g) flexible elements reeved through said pulley means and connecting said lifting arms to said inboard and outboard sections in lifting force transmitting relation; and
   (h) said flexible elements being connected to transmit lifting force to elevate said inboard and outboard sections upwardly above the surface of the ground and simultaneously to pivot said outboard sections upwardly about said hinge means in response to actuation of said plunger means.

2. A carrier for multisection implements comprising:
   a wheel-supported frame having a longitudinally extending center member;
   said center member being inclined upwardly with respect to the surface of the ground;
   ground-engaging implement means connected to said frame and disposed generally below the upper inclined end of said center member;
   said implement means comprising at least one inboard section and plural outboard sections;
   hinge means foldably connecting said outboard sections to said inboard section in side by side relation;
   plural elongated lifting means mounted upon said center member each of which is swingable to one side of said center member;
   plunger means operatively linked to said lifting means to effect swinging of the latter;
   flexible elements connecting said lifting means and said sections in lift force transmitting relation; and
   said flexible elements being connected to transmit lifting force to elevate said sections above the surface of the ground and simultaneously to fold said outboard sections upwardly about said hinge means in response to actuation of said plunger means.

References Cited by the Examiner

UNITED STATES PATENTS

| | | | |
|---|---|---|---|
| 161,830 | 4/75 | Sights | 172—456 |
| 662,605 | 11/00 | Smith | 172—456 |
| 2,599,251 | 6/52 | Garret | 172—456 X |
| 2,672,000 | 3/54 | Speiser | 56—7 |
| 2,775,176 | 12/56 | Gibson | 172—502 |
| 2,828,680 | 4/58 | Johnson | 172—456 X |
| 2,860,471 | 11/58 | Welch | 172—568 X |
| 2,960,346 | 11/60 | Hunter | 172—414 X |

T. GRAHAM CRAVER, *Primary Examiner.*